United States Patent
Kim et al.

(10) Patent No.: US 8,238,355 B2
(45) Date of Patent: Aug. 7, 2012

(54) IP-USN WITH MULTIPLE AND COMMUNICATION METHOD

(75) Inventors: Ki-Hyung Kim, Suwon-si (KR); Won-Do Jung, Suwon-si (KR); Ali Hammad Akbar, Suwon-si (KR)

(73) Assignee: Ajou University Industry-Academic Cooperation Foundation, Suwon-si, Gyeonggi-do (KR)

( * ) Notice: Subject to any disclaimer, the term of this patent is extended or adjusted under 35 U.S.C. 154(b) by 358 days.

(21) Appl. No.: 12/525,665

(22) PCT Filed: Feb. 4, 2007

(86) PCT No.: PCT/KR2007/000593
§ 371 (c)(1),
(2), (4) Date: Aug. 3, 2009

(87) PCT Pub. No.: WO2008/096911
PCT Pub. Date: Aug. 14, 2008

(65) Prior Publication Data
US 2010/0074266 A1    Mar. 25, 2010

(51) Int. Cl.
*H04L 12/28* (2006.01)
*H04L 12/56* (2006.01)
*G06F 15/173* (2006.01)

(52) U.S. Cl. ......... 370/401; 370/389; 370/392; 709/223

(58) Field of Classification Search .......... 370/328–392, 370/401–475; 455/466–560; 709/220–241
See application file for complete search history.

(56) References Cited

U.S. PATENT DOCUMENTS

| | | | | |
|---|---|---|---|---|
| 7,119,676 | B1* | 10/2006 | Silverstrim et al. | 340/531 |
| 7,159,035 | B2* | 1/2007 | Garcia-Luna-Aceves et al. | 709/241 |
| 7,460,532 | B2* | 12/2008 | Shin et al. | 370/389 |
| 7,825,791 | B2* | 11/2010 | Kim et al. | 340/500 |
| 2005/0135360 | A1 | 6/2005 | Shin et al. | |
| 2005/0157698 | A1 | 7/2005 | Park et al. | |
| 2006/0149905 | A1* | 7/2006 | Park et al. | 711/141 |
| 2006/0282498 | A1* | 12/2006 | Muro | 709/203 |
| 2007/0150565 | A1* | 6/2007 | Ayyagari et al. | 709/223 |
| 2008/0136708 | A1* | 6/2008 | Kim et al. | 342/367 |
| 2008/0160938 | A1* | 7/2008 | Hwang et al. | 455/132 |
| 2009/0193027 | A1* | 7/2009 | Ahn et al. | 707/9 |
| 2010/0007483 | A1* | 1/2010 | Oh et al. | 340/521 |
| 2011/0116414 | A1* | 5/2011 | Lee et al. | 370/254 |

* cited by examiner

*Primary Examiner* — M. Phan
(74) *Attorney, Agent, or Firm* — Sherr & Vaughn, PLLC (57) ABSTRACT

A router connects an Internet protocol (IP)-ubiquitous sensor network (USN) with an external network. The IP-USN is disclosed when the IP-USN includes one or more routers. An IP-USN with multiple routers includes one or more routers, and sensor nodes in the IP-USN may reliably communicate with the external network. The sensor nodes in the IP-USN may communicate with one another using the router if necessary. When one router does not operate, communication with the external network is performed by using other routers.

13 Claims, 7 Drawing Sheets

IP-USN WITH MULTIPLE AND COMMUNICATION METHOD

CROSS REFERENCE TO PRIOR APPLICATION

The present application is a National Stage Application of PCT International Application No. PCT/KR2007/000593 (filed on Feb. 4, 2007), under 35 U.S.C. 371, which is hereby incorporated by reference in its entirety.

TECHNICAL FIELD

The present invention relates to a sensor network and more particularly to an Internet protocol (IP)-ubiquitous sensor network (USN) with multiple routers.

BACKGROUND ART

A sensor network is a network that includes many nodes capable of self-computing and communicating with other nodes. Each node of the sensor network may collect information including temperature, pressure and humidity through the sensor adhered to the node, and may self-analyze the information from the sensor by self-computing.

The sensor network may collect unprocessed results from the sensors and the analyzed results to a few nodes through communication among the nodes. In addition, the sensor nodes may collect information at a fixed position, or the sensor nodes may have mobility due to abrupt changes in the environment. Therefore, the sensor network requires a sensor collecting information and communicating with other nodes, communication equipment, a routing protocol helping communication among the nodes, and an application analyzing the information from the sensors.

Therefore, the sensor nodes are required to be implemented with the simplest elements possible, and thus the sensor nodes need to include a limited power supply and a storage device, and a communication capability that is simple and is not a burden to the nodes. In addition, the sensor nodes need to be capable of rapid topology reconfiguration, because the topology of the sensor nodes changes frequently due to environmental influence. In addition, when only one router is included, communication is possible only among the sensor nodes.

DISCLOSURE OF THE INVENTION

Technical Problem

The present invention provides an Internet protocol (IP)-ubiquitous sensor network (USN) with multiple routers that includes one or more routers, such that the sensor nodes communicate with one another through the router.

The present invention provides a communication method of an IP-USN with multiple routers that includes one or more routers, such that the sensor nodes communicate with one another through the router in addition to communication with an external network.

Technical Solution

Accordingly, the present invention is provided to substantially obviate one or more problems due to limitations and disadvantages of the related art.

In some embodiments of the present invention, an Internet protocol (IP)-ubiquitous sensor network (USN) with multiple routers includes a plurality of sensor nodes having corresponding location information and performing corresponding functions, and one or more routers that the sensor nodes use for communication with an external network. Each of the sensor nodes designates the nearest router of the routers with respect to each of the sensor nodes as a default router, and communicates with the external network through the external router.

Each of the sensor nodes may broadcast a router request (RREQ) message at a fixed first frequency, and each of the routers that receive the RREQ message stores location information of the corresponding sensor nodes in mapping tables, respectively, and the RREQ message may provide the locations of the corresponding sensor nodes.

The routers may broadcast router advertisement (RA) messages at a fixed second frequency, respectively, for updating the location information stored in the mapping table, and the RA messages may provide the locations of the corresponding routers.

The sensor nodes that receive the RA messages may be registered to a router that broadcasts the RA messages received via the shortest distance.

The RREQ message may include distance information corresponding to the distance from a sensor node broadcasting the RREQ message to the router receiving the corresponding RREQ message.

The distance information included in the RREQ may increase by a unit distance whenever the RREQ message passes through sensor nodes from the sensor node broadcasting the RREQ message to the router receiving the corresponding RREQ message.

The router that receives the corresponding RREQ message may transmit the RREQ message to another router.

The distance information included in the RREQ may increase by a unit distance, when the router that receives the corresponding RREQ message transmits the RREQ message to another router.

The router that receives the corresponding RREQ message may transmit a router reply (RREP) message to the sensor node, when the sensor node broadcasting the RREQ message corresponds to a sensor node that designates the router as the default router.

When one of the routers does not broadcast the RA messages at higher than the second frequency, other routers may broadcast the RA messages, and the sensor nodes designate new default routers.

When the sensor nodes communicate with one another, the sensor nodes may communicate with one another through the routers when paths through the routers are shorter than paths not going through the routers.

In some embodiments of the present invention, communication method of an IP-USN with multiple routers that includes a plurality of sensor nodes having corresponding location information, and performs corresponding function and one or more IP-USN routers that the sensor nodes use for communication with an external network includes: broadcasting an RREQ message at a fixed first frequency, the RREQ message providing the locations of the corresponding sensor nodes; storing location information of the sensor nodes in mapping tables of the IP-USN routers that receive the RREQ message; broadcasting RA messages at a fixed second frequency for updating the location information, the RA messages providing the locations of the corresponding routers; designating a router as a default router that broadcasts the RA messages received via the shortest distance; transmitting the corresponding RREQ message received by the router to another router; transmitting an RREP message to the sensor node, when the sensor node broadcasting the RREQ message corresponds to a sensor node that designates the router as the default router; and communicating with the external network through the router that transmits the RREP message including the shortest distance information, which is performed by the sensor node that broadcasts the corresponding RREQ message.

The RREQ message may include distance information corresponding to the distance from a sensor node broadcasting the RREQ message to the router receiving the corresponding RREQ message.

The distance information included in the RREQ may increase by a unit distance whenever the RREQ message passes through sensor nodes from the sensor node broadcasting the RREQ message to the router receiving the corresponding RREQ message.

The router that receives the corresponding RREQ message may transmit the RREQ message to another router through the external network.

The distance information included in the RREQ may increase by a unit distance, when the RREQ message is transmitted.

The communication may further include broadcasting of the RA messages at the fixed second frequency by the routers, respectively, to exchange mapping tables with each other.

The communication method may further include broadcasting of the RA messages by other routers to designate new default routers to the sensor nodes when one of the routers does not broadcast the RA messages at higher than the second frequency.

BRIEF DESCRIPTION OF THE DRAWINGS

The above and other advantages of the present invention will become more apparent by describing in detail example embodiments thereof with reference to the accompanying drawings, in which.

BEST MODE FOR CARRYING OUT THE INVENTION

Embodiments of the present invention now will be described more fully with reference to the accompanying drawings, in which embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
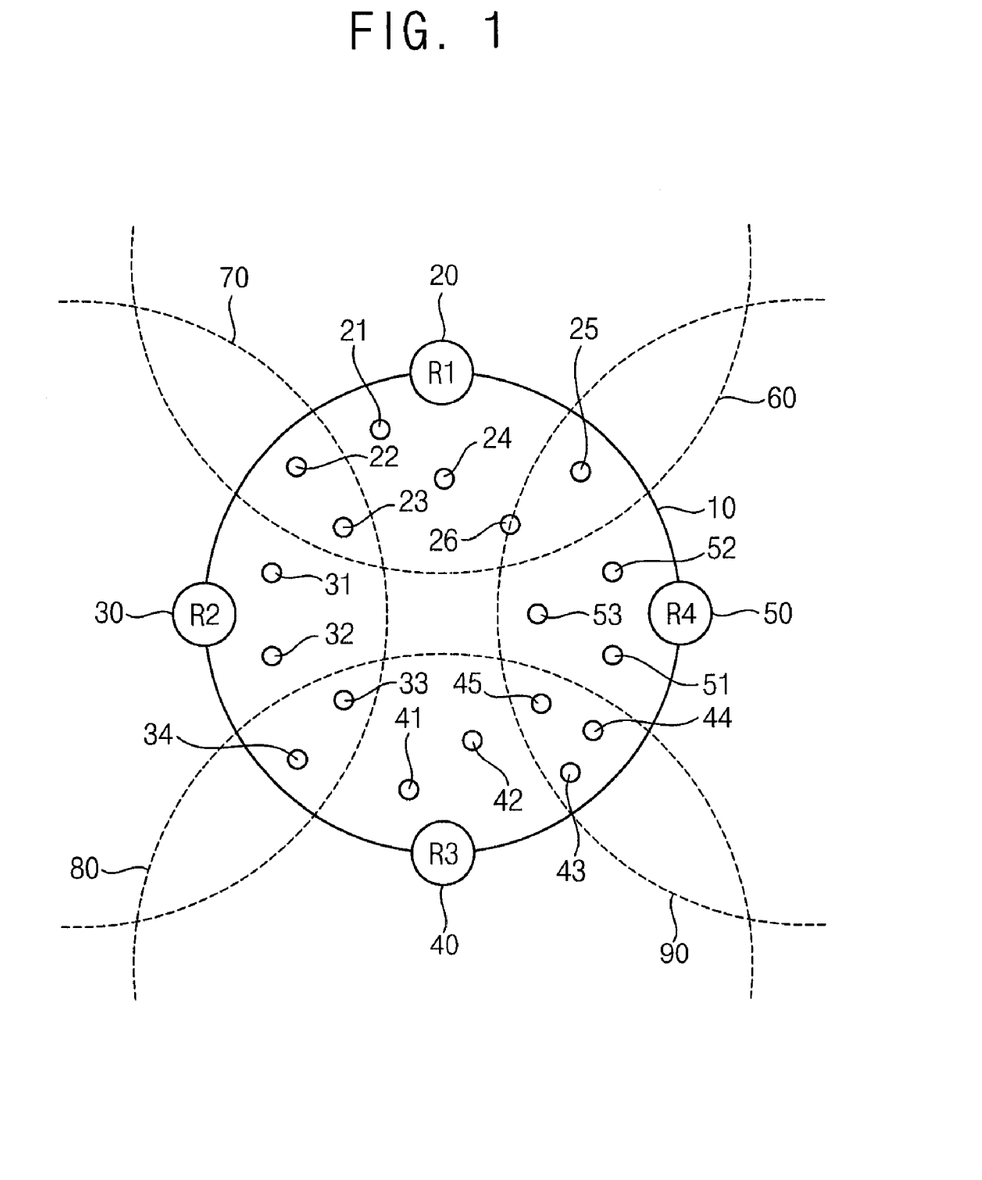
FIG. 1 is a diagram illustrating an Internet protocol (IP)-ubiquitous sensor network (USN) with multiple routers according to an example embodiment of the present invention.

FIG. 1 is a diagram illustrating an Internet protocol (IP)-ubiquitous sensor network (USN) with multiple routers according to an example embodiment of the present invention.

Referring to FIG. 1, an IP-USN with multiple routers 10 includes a plurality of routers 20, 30, 40 and 50, and a plurality of sensor nodes 21 to 25, 31 to 34, 41 to 45 and 51 to 54. The sensor nodes 21 to 25, 31 to 34, 41 to 45 and 51 to 54 have corresponding location information, and perform corresponding functions. The sensor nodes 21 to 25, 31 to 34, 41 to 45 and 51 to 54 are capable of self-computing and communicating with other nodes through the sensors. The sensor nodes 21 to 25, 31 to 34, 41 to 45 and 51 to 54 use the routers 20, 30, 40 and 50 for communicating with an external network.

The sensor nodes 21 to 25, 31 to 34, 41 to 45 and 51 to 54 designate the nearest router of the routers with respect to each of the sensor nodes as a default router and communicate with the external network through the external router, respectively.

The nodes 21 to 25 may designate the router 20 as the default router. The nodes 31 to 34 may designate the router 30 as the default router. The nodes 41 to 45 may designate the router 40 as the default router. The nodes 51 to 54 may designate the router 50 as the default router. The router 20 is designated as the default router by the sensor nodes 21 to 25 in a region 60. The router 30 is designated as the default router by the sensor nodes 22, 23 and 31 to 34 in a region 70. The router 40 is designated as the default router by the sensor nodes 33, 34 and 41 to 45 in a region 80. The router 50 is designated as the default router by the sensor nodes 25, 43, 44, 45 and 51 to 53 in a region 90.

Figure 2:
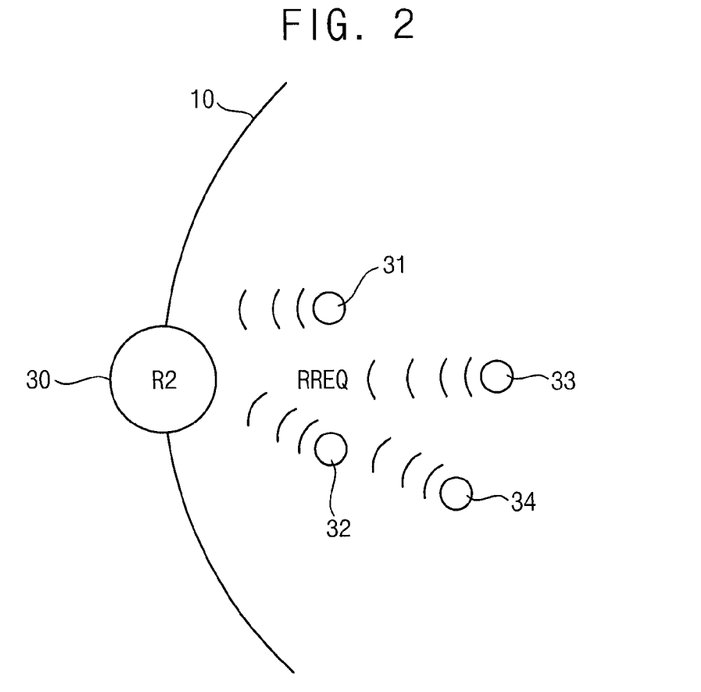
FIG. 2 is a diagram illustrating sensor nodes broadcasting a router request (RREQ) message providing the locations of the corresponding sensor nodes at a fixed frequency.

FIG. 2 is a diagram illustrating the sensor nodes broadcasting a router request (RREQ) message providing the locations of the corresponding sensor nodes at a fixed frequency.

In FIG. 2, the router 30 and the nodes 31 to 34 are illustrated for convenience of explanation. Other nodes 31, 32 and 34 broadcast the RREQ message in addition to the node 33. The router 30 receives the RREQ message and stores location information of the corresponding sensor node 30 in a mapping table.

Figure 3:
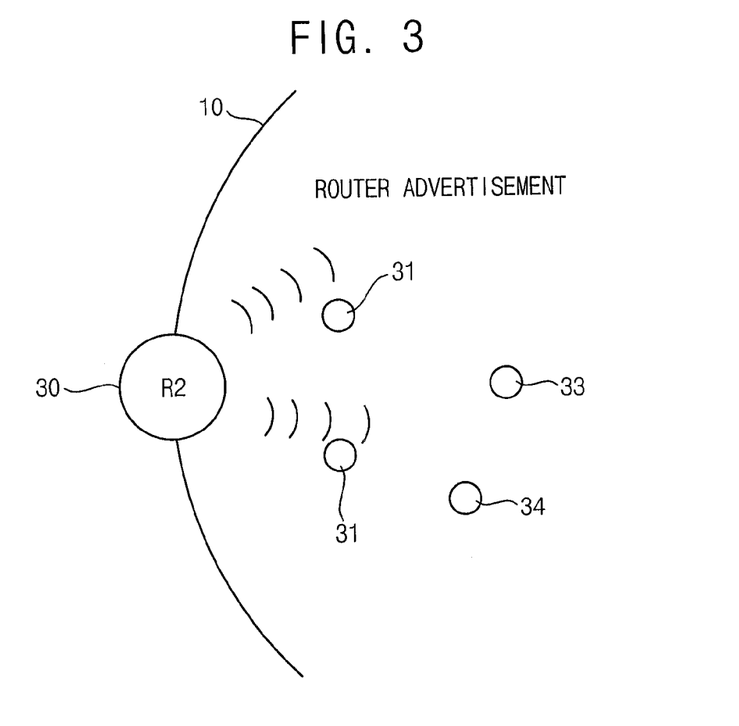
FIG. 3 is a diagram illustrating a router broadcasting router advertisement (RA) messages.

FIG. 3 is a diagram illustrating the router broadcasting router advertisement (RA) messages.

The router 30 broadcasts RA messages at a fixed frequency for updating the location information stored in the mapping table, and the RA messages provides the locations of the corresponding routers.

The sensor nodes that receive the RA messages are registered to a router that broadcasts the RA messages received via the shortest distance of all the RA messages. Therefore, the mapping table may have updated information.

Figure 4:
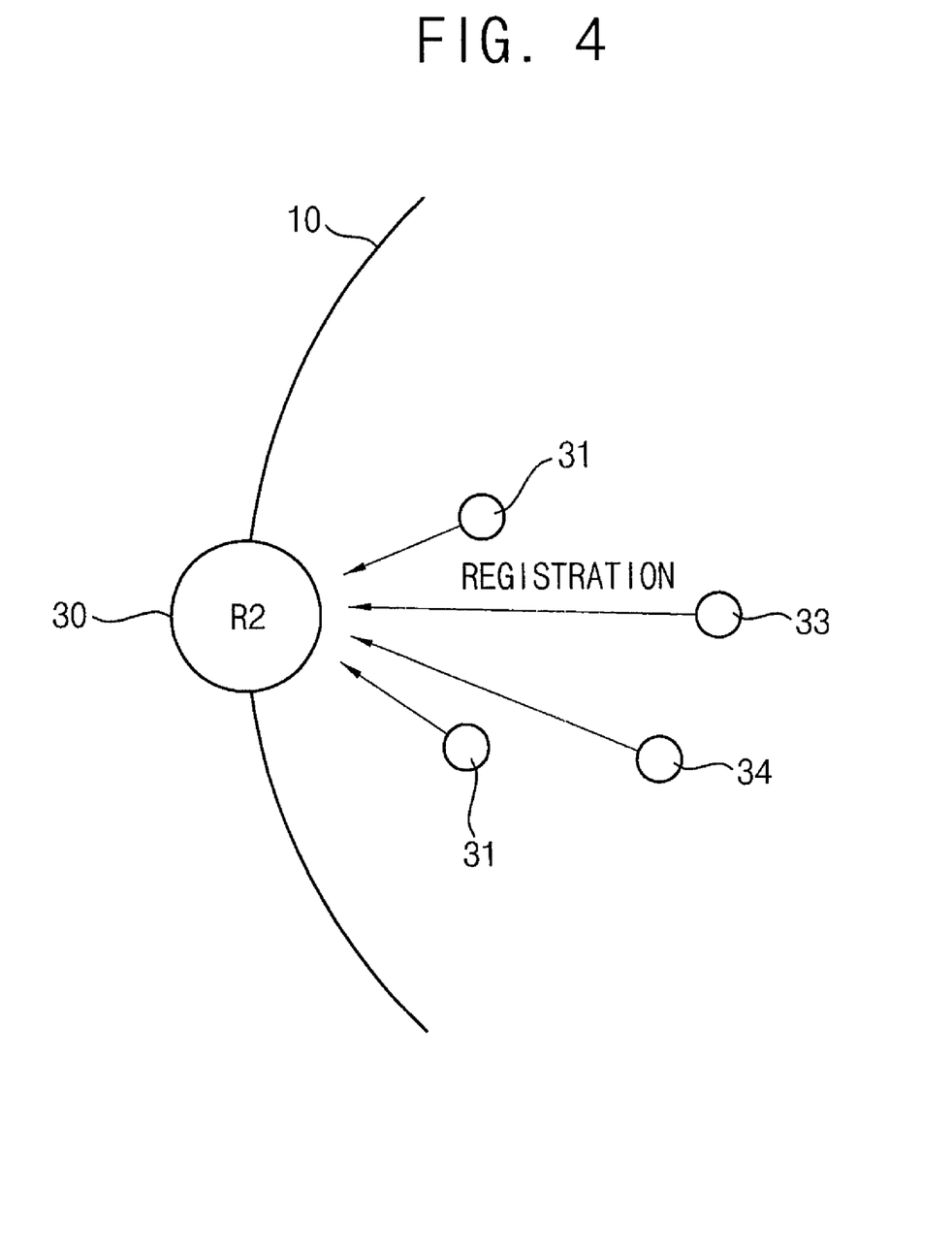
FIG. 4 is a diagram illustrating the sensor nodes registering with the router.

FIG. 4 is a diagram illustrating the sensor nodes registering with the router.

In FIGS. 3 and 4, the router 30 and the nodes 31 to 34 are illustrated for convenience of explanation; however, other routers and other sensor nodes perform substantially the same functions.

Figure 5:
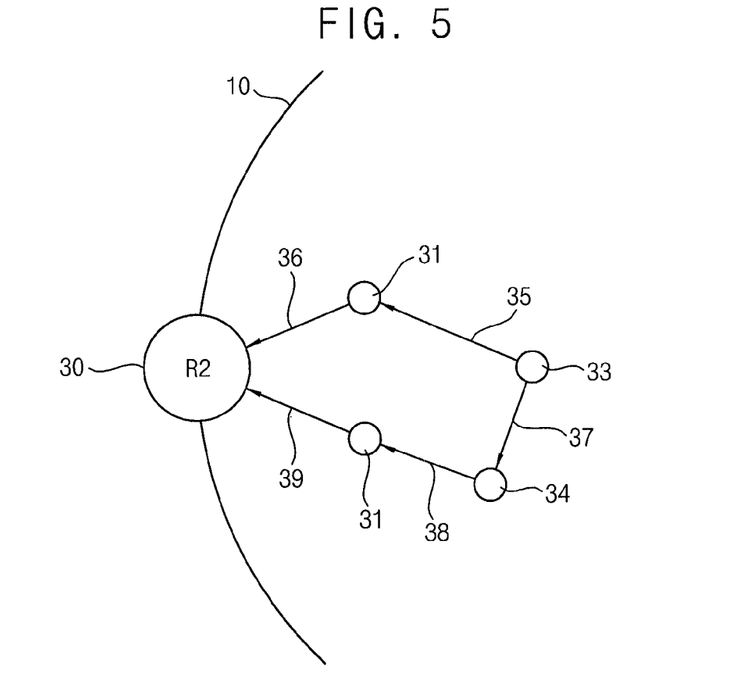
FIG. 5 is a diagram illustrating a path of the RREQ message from a sensor node to a router.

FIG. 5 is a diagram illustrating a path of the RREQ message from a sensor node to a router.

In FIG. 5, the RREQ message from the sensor node 33 arrives at the router 30 via a first path 35, 31 and 36. In the first path 35, 31 and 36, the RREQ message passes through one intermediate sensor node 31. The RREQ message from the sensor node 33 arrives at the router 30 via a second path 37, 34, 38, 31 and 39. In the second path 37, 34, 38, 31 and 39, the RREQ message passes through two intermediate sensor nodes 34 and 31. The RREQ message includes distance information corresponding to the distance from a sensor node to the router. The distance information included in the RREQ increases by a unit distance, for example, one unit distance, whenever the RREQ message passes through intermediate sensor nodes. In the first path 35, 31 and 36, the distance information corresponds to one unit distance, and in the second path 37, 34, 38, 31 and 39 the distance information corresponds to two unit distances.

Figure 6:
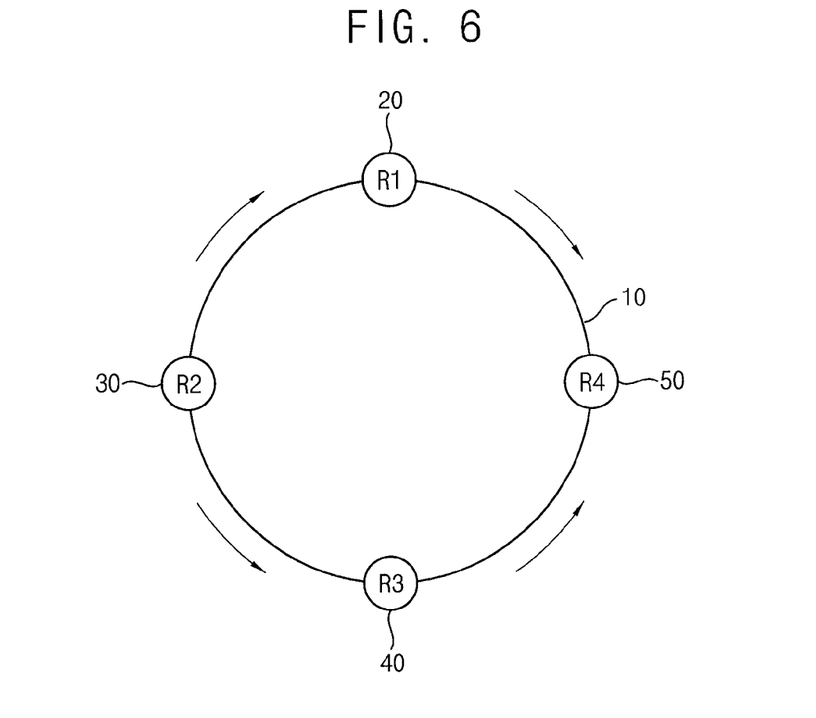
FIG. 6 is a diagram illustrating a router that receives the RREQ message transmitting the RREQ message to other routers.

FIG. 6 is a diagram illustrating a router that receives the RREQ message transmitting the RREQ message to other routers.

Referring to FIG. 6 the router 30 receives the RREQ message from the sensor node 33, and transmits the received RREQ message to other routers 20, 40 and 50. Transmission of the RREQ message among the routers may be performed through a reliable external network. In this case, the distance information increases by a unit distance whenever the RREQ message passes through a router. For example, the distance information corresponding to the distance from the router 30 to the router 20 corresponds to one unit distance, and the distance information corresponding to the distance from the router 30 to the router 50 corresponds to two unit distances.

Figure 7:
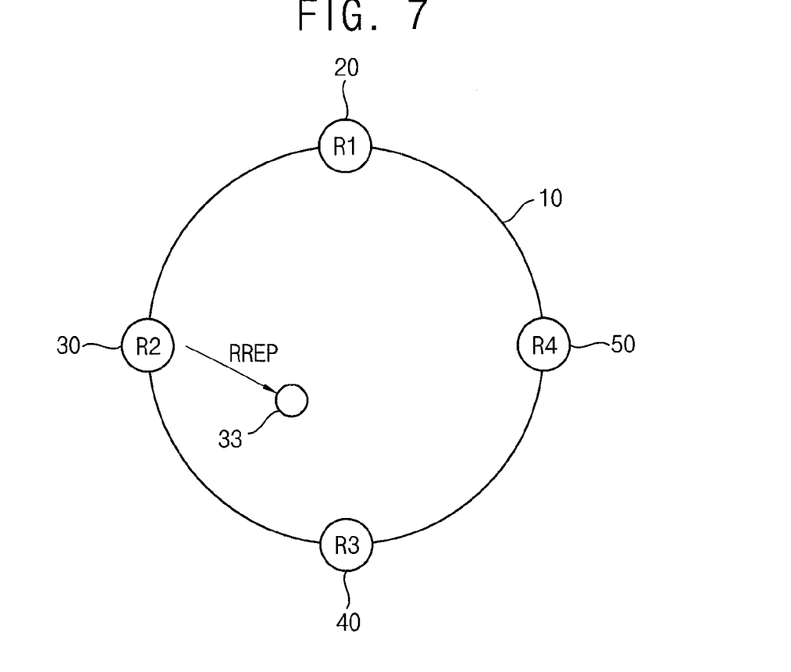
FIG. 7 is a diagram illustrating a router transmitting a router reply (RREP) message.

FIG. 7 is a diagram illustrating a router transmitting the RREP message.

The router that receives the corresponding RREQ message transmits a router reply (RREP) message to the sensor node, when the sensor node broadcasting the RREQ message corresponds to a sensor node that designates the router as the default router. Referring to FIG. 7, the router 70 transmits the RREP message to the sensor node 33. The RREP message includes the distance information included in the RREQ message. The sensor node 33 that receives the RREP message from the router 30, communicates with an external network through the path through which the RREP message including the shortest distance information passes.

Figure 8:
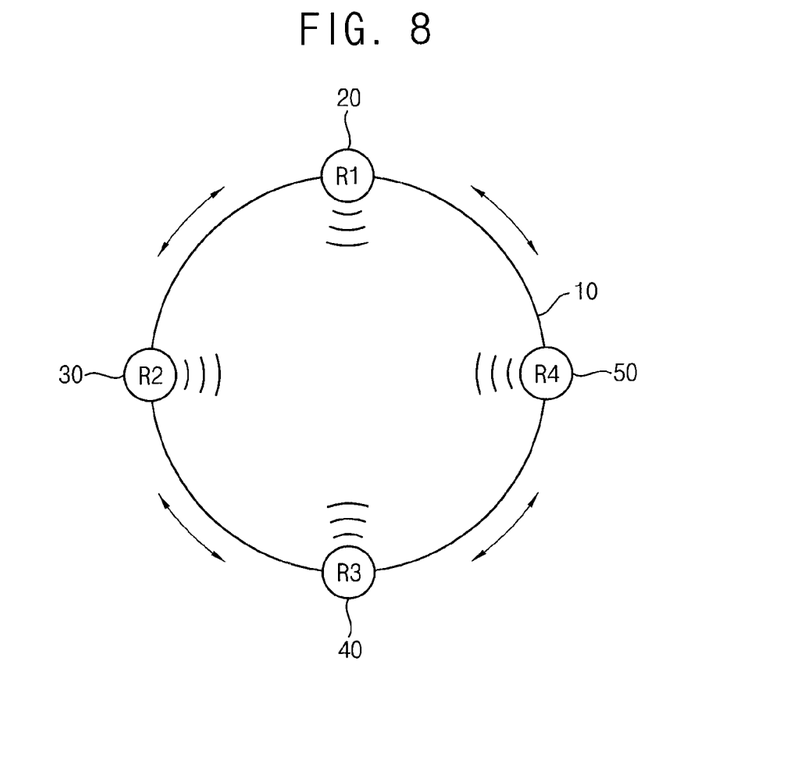
FIG. 8 is a diagram illustrating routers broadcasting the RA messages at a fixed second frequency, and exchanging mapping tables with each other.

FIG. 8 is a diagram illustrating routers broadcasting the RA messages at a fixed second frequency, and exchanging mapping tables with each other.

Figure 9:
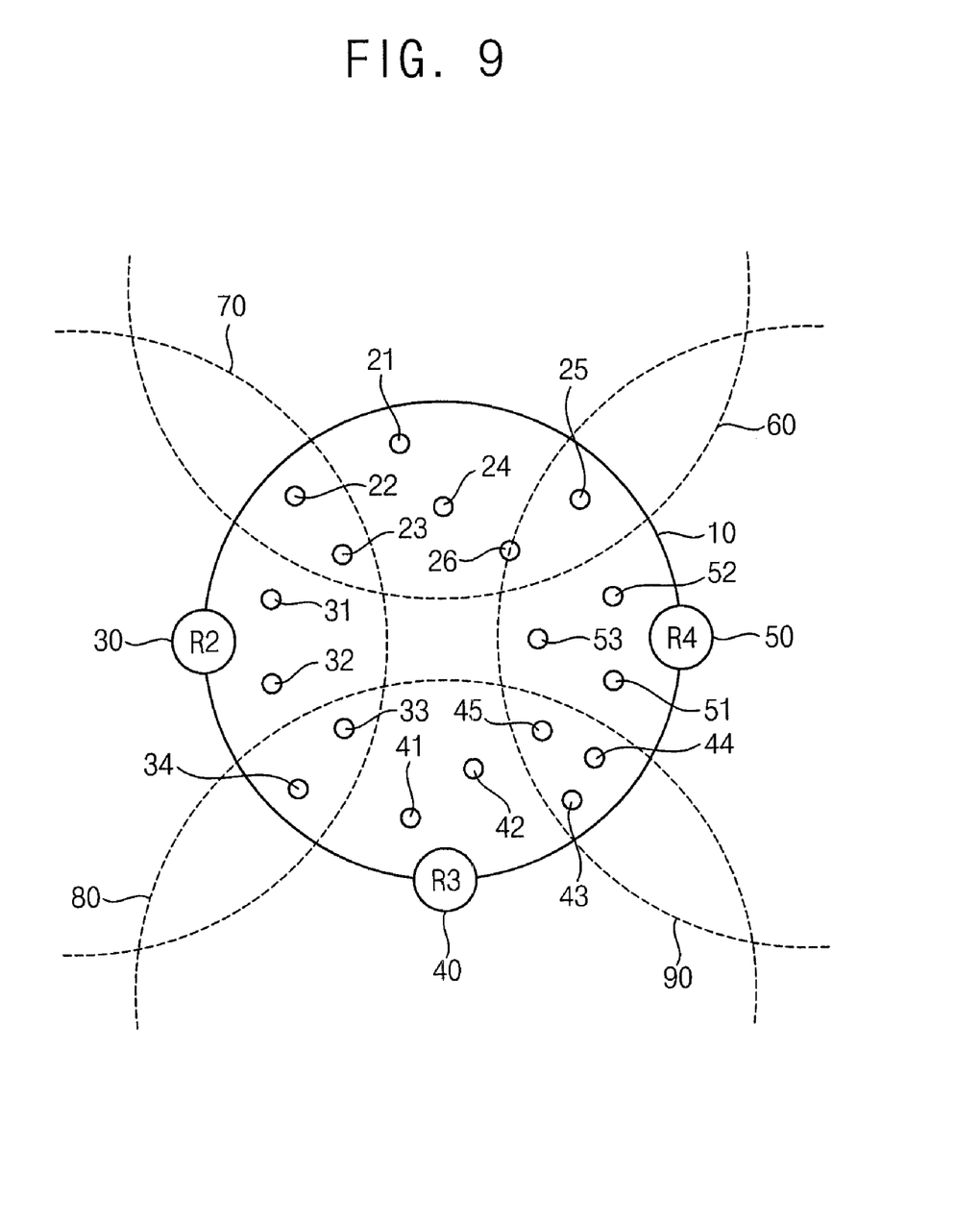
FIG. 9 is a diagram illustrating the IP-USN when one router does not operate.

FIG. 9 is a diagram illustrating the IP-USN when one router does not operate.

Referring to FIGS. 8 and 9, the routers 20, 30, 40, 50 respectively broadcast RA messages providing their own location and exchange mapping tables with each other for exchanging information of the sensor nodes respectively designating their own default routers.

Referring to FIG. 9, when the router 20 does not broadcast the RA messages at higher than the fixed frequency, the router 20 is determined to be not operating, and other routers 30, 40 and 50 broadcast the RA messages in place of the router 20. As such, the sensor nodes that designate the non-operating router 20 as the default router may designate other routers as a default router to communicate with an external network.

Referring to FIGS. 1 and 8, sensor nodes may use routers when communication is performed among the sensor nodes.

When the sensor node 21 that designates the router 20 as a default router communicates with the sensor node 34 that designates the router 30 as a default router, a path via the sensor node 21, the router 20, the router 30, and the sensor node 34 is shorter than a path via other sensor nodes.

Figure 10:
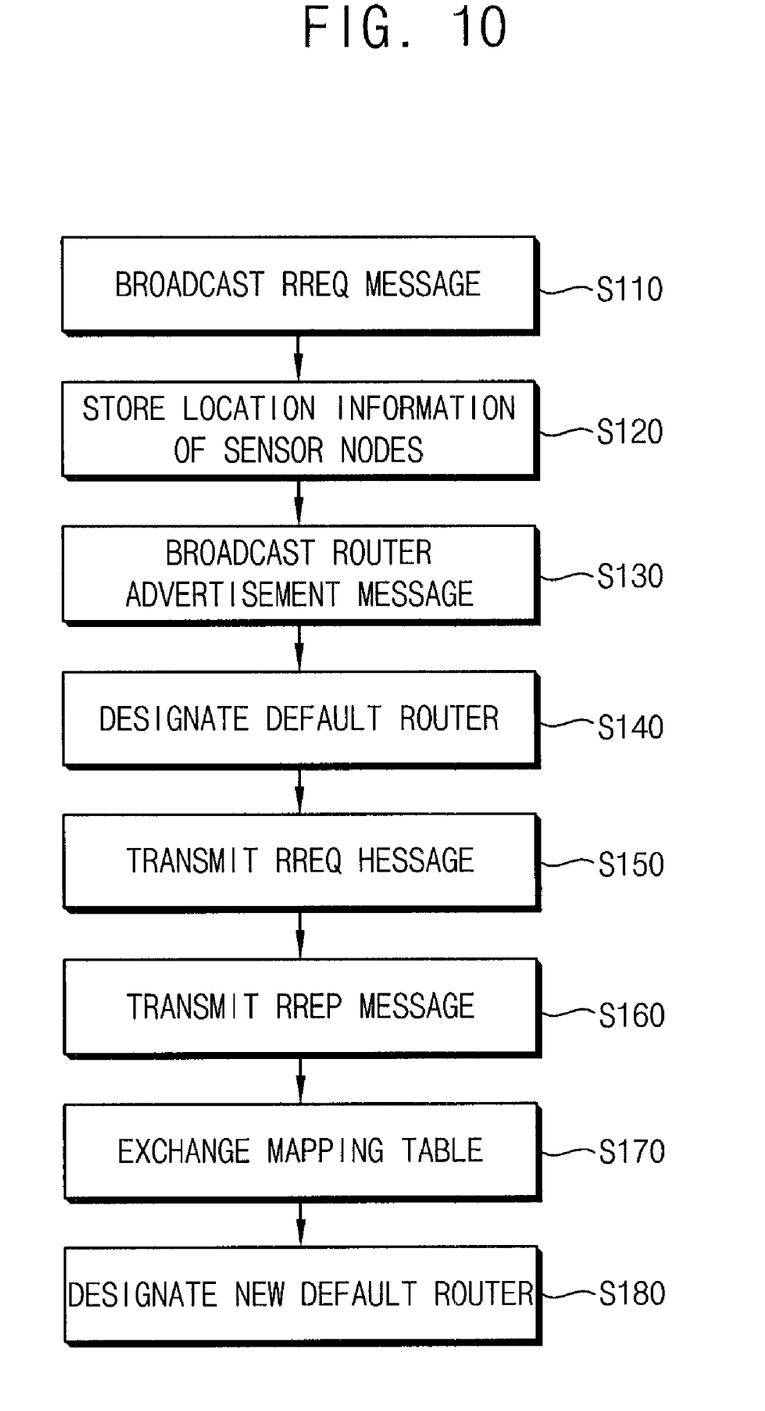
FIG. 10 is a flowchart illustrating a communication method of an IP-USN with multiple routers according to an example embodiment of the present invention.

FIG. 10 is a flowchart illustrating a communication method of an IP-USN with multiple routers according to an example embodiment of the present invention.

Referring to FIG. 10, a communication method of an IP-USN with multiple routers includes broadcasting an RREQ message at a fixed first frequency, the RREQ message providing the locations of the corresponding sensor nodes (step S110), storing location information of the sensor nodes in mapping tables of the IP-USN routers that receive the RREQ message (step S120), broadcasting RA messages at a fixed second frequency for updating the location information, the RA messages providing the locations of the corresponding routers (step S130), designating a router as a default router that broadcasts the RA messages received via the shortest distance (step S140), transmitting the corresponding RREQ message received by the router to another router (step S150), transmitting an RREP message to the sensor node, when the sensor node broadcasting the RREQ message corresponds to a sensor node that designates the router as the default router, and communicating with the external network through the router that transmits the RREP message including the shortest distance information, which is performed by the sensor node that broadcasts the corresponding RREQ message (step S160). In addition, the communication method includes comprising broadcasting the RA messages at the fixed second frequency by the routers, respectively, to exchange mapping tables with each other (step S170). In addition, the communication method includes broadcasting of the RA messages by other routers to designate new default routers to the sensor nodes when one of the routers does not broadcast the RA messages at higher than the second frequency (step S180). Detailed descriptions about the communication method will be omitted because the communication method is already described in detail with reference to FIGS. 1 through 7.

INDUSTRIAL APPLICABILITY

According to example embodiments of the present invention, reliable communication may be performed with an external network by using an Internet protocol (IP)-ubiquitous sensor network (USN) that includes one or more routers, and a router may be used in communication among the sensor nodes in the IP-USN.

While the present invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

The invention claimed is:

1. An Internet protocol (IP)-ubiquitous sensor network (USN), comprising:
a plurality of sensor nodes having location information and performing a plurality of functions; and
at least one router that the sensor nodes use for communication with an external network, each of the sensor nodes designating a nearest router with respect to each of the sensor nodes as a default router, and communicating with the external network through the router,
wherein each of the sensor nodes broadcast a router request (RREQ) message at a fixed first frequency, and each router that receives the RREQ message stores location information of the corresponding sensor nodes in mapping tables, the RREQ message providing the locations of the corresponding sensor nodes,
wherein each router respectively broadcasts router advertisement (RA) messages at a fixed second frequency for updating the location information stored in the mapping table, the RA messages providing a location of each corresponding router,
wherein the sensor nodes that receive the RA messages are registered to a router that broadcasts an RA message received via the shortest distance,
wherein the RREQ message includes distance information corresponding to the distance from a sensor node broadcasting the RREQ message to a router receiving the corresponding RREQ message,
wherein the distance information included in the RREQ increases by a unit distance whenever the RREQ message passes through a sensor node from the sensor node broadcasting the RREQ message to the router receiving the corresponding RREQ message.

2. The IP-USN of claim 1, including at least two routers, wherein a router that receives the corresponding RREQ message transmits the RREQ message to another router.

3. The IP-USN of claim 2, wherein the router that receives the corresponding RREQ message transmits the RREQ message to another router through the external network.

4. The IP-USN of claim 2, wherein the distance information included in the RREQ increases by a unit distance, when the router that receives the corresponding RREQ message transmits the RREQ message to another router.

5. The IP-USN of claim 4, wherein the router that receives the corresponding RREQ message transmits a router reply (RREP) message to the sensor node, when the sensor node broadcasting the RREQ message corresponds to a sensor node that designates the router as the default router.

6. The IP-USN of claim 1, including at least two routers, wherein the routers respectively broadcast the RA messages at the fixed second frequency, and exchange mapping tables with each other.

7. The IP-USN of claim 6, wherein when one of the routers does not broadcast the RA messages at higher than the second frequency, other routers broadcast the RA messages, and the sensor nodes designate new default routers.

8. The IP-USN of claim 1, wherein when the sensor nodes communicate with one another, the sensor nodes communicate with one another through a router when a path through the router is shorter than a path not going through the router.

9. A communication method of an Internet protocol (IP)-ubiquitous sensor network (USN) with multiple routers, the IP-USN including a plurality of sensor nodes having corresponding location information and performing corresponding functions, and a plurality of IP-USN routers that the sensor nodes use for communication with an external network, the communication method comprising:
broadcasting a router request (RREQ) message at a fixed first frequency, the RREQ message providing the locations of the corresponding sensor nodes;
storing location information of the sensor nodes in mapping tables of the IP-USN routers that receive the RREQ message;
broadcasting router advertisement (RA) messages at a fixed second frequency for updating the location information, the RA messages providing the locations of the corresponding routers;
designating a router that broadcasts the RA messages received via the shortest distance as a default router;
transmitting the corresponding RREQ message received by the router to another router;
transmitting a router reply (RREP) message from a default router to a sensor node, when the sensor node broadcasting the RREQ message corresponds to a sensor node that designates the router as the default router; and
communicating between the external network and the sensor node that broadcasts the corresponding RREQ message through the router that transmits the RREP message including the shortest distance information,
wherein the RREQ message includes distance corresponding to the distance from a sensor node broadcasting the RREQ message to the router receiving the corresponding RREQ message,
wherein the distance information included in the RREQ increases by a unit distance whenever the RREQ message passes through a sensor node from the sensor node broadcasting the RREQ message to the router receiving the corresponding RREQ message.

10. The communication method of claim 9, wherein the router that receives the corresponding RREQ message transmits the RREQ message to another router through the external network.

11. The communication method of claim 10, wherein the distance information included in the RREQ increases by a unit distance, when the RREQ message is transmitted.

12. The communication method of claim 9, further comprising broadcasting the RA messages at the fixed second frequency by the routers, to exchange mapping tables between the routers.

13. The communication method of claim 12, including broadcasting the RA messages by other routers to designate new default routers to the sensor nodes when one of the routers does not broadcast the RA messages at higher than the second frequency.

* * * * *